(12) United States Patent
Yamartino

(10) Patent No.: US 8,010,225 B2
(45) Date of Patent: Aug. 30, 2011

(54) METHOD AND SYSTEM OF MONITORING MANUFACTURING EQUIPMENT

(75) Inventor: John M. Yamartino, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/022,448

(22) Filed: Jan. 30, 2008

(65) Prior Publication Data

US 2009/0192632 A1   Jul. 30, 2009

(51) Int. Cl.
*G06F 19/00* (2011.01)
*G01L 7/00* (2006.01)
*G01F 19/00* (2006.01)
*C03B 5/027* (2006.01)
*B44C 1/22* (2006.01)

(52) U.S. Cl. ............. 700/180; 73/714; 73/426; 373/31; 373/32; 216/37

(58) Field of Classification Search .................. 700/180; 74/714, 426; 373/31, 32; 216/37; 73/571, 73/863.73, 714, 426
See application file for complete search history.

(56) References Cited

U.S. PATENT DOCUMENTS

| | | | | |
|---|---|---|---|---|
| 3,711,212 A * | 1/1973 | Kuck | ................................. | 408/3 |
| 4,150,560 A * | 4/1979 | Wieland | ....................... | 73/19.06 |
| 5,269,203 A * | 12/1993 | Ueda | ............................... | 477/131 |
| 6,546,820 B1 * | 4/2003 | Van et al. | ..................... | 73/865.8 |
| 6,615,090 B1 * | 9/2003 | Blevins et al. | ................. | 700/26 |
| 6,984,833 B2 * | 1/2006 | Sano et al. | ............... | 250/492.21 |
| 7,165,011 B1 * | 1/2007 | Kaushal et al. | ............... | 702/182 |
| 7,258,838 B2 * | 8/2007 | Li et al. | ........................ | 422/68.1 |
| 7,695,984 B1 * | 4/2010 | Monkowski et al. | ............. | 438/5 |
| 2001/0026949 A1 * | 10/2001 | Ogawa et al. | .................... | 438/15 |
| 2005/0026434 A1 * | 2/2005 | Huy et al. | ..................... | 438/689 |
| 2005/0252455 A1 * | 11/2005 | Moriya et al. | ................ | 118/729 |
| 2005/0263072 A1 * | 12/2005 | Balasubramanian et al. | | 118/715 |
| 2006/0031788 A1 * | 2/2006 | Bauer | .............................. | 716/1 |
| 2006/0064188 A1 * | 3/2006 | Ushiku et al. | .................... | 700/96 |
| 2006/0090731 A1 * | 5/2006 | Hoshino et al. | ............... | 123/399 |
| 2006/0124242 A1 * | 6/2006 | Kanarik et al. | .......... | 156/345.24 |
| 2006/0172829 A1 * | 8/2006 | Ishio | ............................... | 474/18 |
| 2006/0174701 A1 * | 8/2006 | Musashi et al. | .............. | 73/118.1 |
| 2006/0223202 A1 * | 10/2006 | Choi et al. | ....................... | 438/14 |
| 2006/0234514 A1 * | 10/2006 | Gianoulakis et al. | .......... | 438/758 |
| 2007/0201016 A1 * | 8/2007 | Song et al. | ....................... | 356/72 |
| 2007/0238199 A1 * | 10/2007 | Yamashita | ........................ | 438/5 |
| 2008/0067146 A1 * | 3/2008 | Onishi et al. | .................... | 216/59 |
| 2008/0228315 A1 * | 9/2008 | Wendner et al. | ............. | 700/180 |
| 2009/0164038 A1 * | 6/2009 | Bretschneider et al. | ....... | 700/105 |

* cited by examiner

*Primary Examiner* — Albert Decady
*Assistant Examiner* — Jason Lin
(74) *Attorney, Agent, or Firm* — Ian D. MacKinnon; Roberts Mlotkowski Safran & Cole, P.C.

(57) ABSTRACT

A method and system is provided for monitoring manufacturing equipment and, more particularly, for monitoring manufacturing equipment in a semiconductor fabrication facility using existing tool elements. The method includes operating a tool working at an operating mode such that at least one of its control parameters is outside of a normal operating range, and measuring the at least on of the control parameters of the tool working at the operating mode outside of the normal operating range. The method further includes detecting a change to a condition of the tool based on the measuring of the at least one control parameter.

20 Claims, 7 Drawing Sheets

METHOD AND SYSTEM OF MONITORING MANUFACTURING EQUIPMENT

FIELD OF THE INVENTION

The invention relates to a method and system of monitoring manufacturing equipment and, more particularly, to a method and system of monitoring manufacturing equipment in a semiconductor fabrication facility using existing tool elements.

BACKGROUND DESCRIPTION

Monitoring of manufacturing equipment is achieved by recording data from the manufacturing equipment (e.g., tool or chamber) during the performance of manufacturing tasks. That is, monitoring of the tool is achieved during normal operating conditions. Data may also be recorded while the tool is performing other routine tasks such as conditioning steps (cleaning, warm-up, seasoning, etc.) that prepare the tool for the next manufacturing process step. The data consists of recorded values from multiple elements on the tool collectively known as sensors. Examples of sensors include: temperature, flow rate, pressure, power as well as control elements such as pressure control valves and variable capacitors.

The data are used to monitor the behavior of the tool during all of these tasks. The data may be used for statistical process control (SPC), Fault Detection and Classification (FDC) or other monitoring or analyses. The methods for observing tool behavior may include univariate or multivariate methods for determining unusual behavior such as drifts, shifts, instabilities or periodic behavior.

The data recorded from the tools represent a measure of the state of the tool at various times during the manufacturing process. However, due to physical and economical limitations as well as (in some cases) a simple lack of sensors, it represents an incomplete measure of the tool state.

While it is physically impossible to know everything about the state of a tool during manufacturing or running other routine tasks, it is certainly possible to add more sensors to the equipment. However, this may be difficult from both an engineering and economical perspective. Therefore, current tool monitoring methods are inherently incomplete.

More specifically, as some aspects of the process are invisible either because the sensor does not exist or because a sensor is not sensitive to possible variations, it is not possible to make accurate measurements of important tool and process properties. For example, some gas properties in plasma processing are not observable with existing chamber sensors, e.g., gas temperature and gas dissociation level. Also, some chamber properties are not observable during process, e.g., chamber wall condition and outgassing, chamber conductance, and pressure or mass flow control (MFC) calibration.

Accordingly, there exists a need in the art to overcome the deficiencies and limitations described hereinabove.

SUMMARY OF THE INVENTION

In a first aspect of the invention, a method comprises operating a tool working at an operating mode such that at least one of its control parameters is outside of a normal operating range and measuring the at least on of the control parameters of the tool working at the operating mode outside of the normal operating range. The method further comprising detecting a change to a condition of the tool based on the measuring of the at least one control parameter.

In another aspect of the invention, a method comprises measuring parameters of multiple tools while they operate outside of their normal operating range and comparing the parameters to determine the relative condition of the various tools.

In a further aspect of the invention, a system is provided for monitoring conditions in tools implemented on a computer program product comprising a computer readable media. The computer program product is operable to: measure at least on of control parameter of a tool working at an operating mode outside of its normal operating range; and detect a change to a condition of the tool based on the measuring of the at least one control parameter.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention relates to a method and system of monitoring manufacturing equipment and, more particularly, to a method and system of monitoring manufacturing equipment in a semiconductor fabrication facility. In implementation, the method and system of the invention monitors the manufacturing equipment (tool) when the tool is operated outside of a normal or routine operating mode, i.e., where control is poor and thus avoided. By operating the tool outside of the normal operating parameters, it is possible to obtain information about the state of the tool, with existing control elements, that cannot be obtained with data recorded during routing or normal operating conditions. In effect, the mode of operation (i.e., outside a normal operation mode) effectively creates a new sensor (or sensors) from the existing tool elements. While a level of tool control is lost, a new level of sensor capability is gained, which is referred to as a sensor mode or as a sensor step.

The system and method of the invention provides many advantages. For example, the system and method of the invention provides information about the state of the tool that is not obtainable otherwise using conventional sensors. Also, advantageously, the system and method of the present invention does not require the installation of any new sensors and is thus a free, non-invasive way to sense new properties of the tool and manufacturing process. The system and method of the invention can also compare chamber conditions of a single tool between processing steps or can make a comparison amongst many chambers, any of which is used to ensure uniformity of processing. The data may also be used for statistical process control (SPC), Fault Detection and Classification (FDC) or other monitoring or analyses

System Environment

Figure 1:
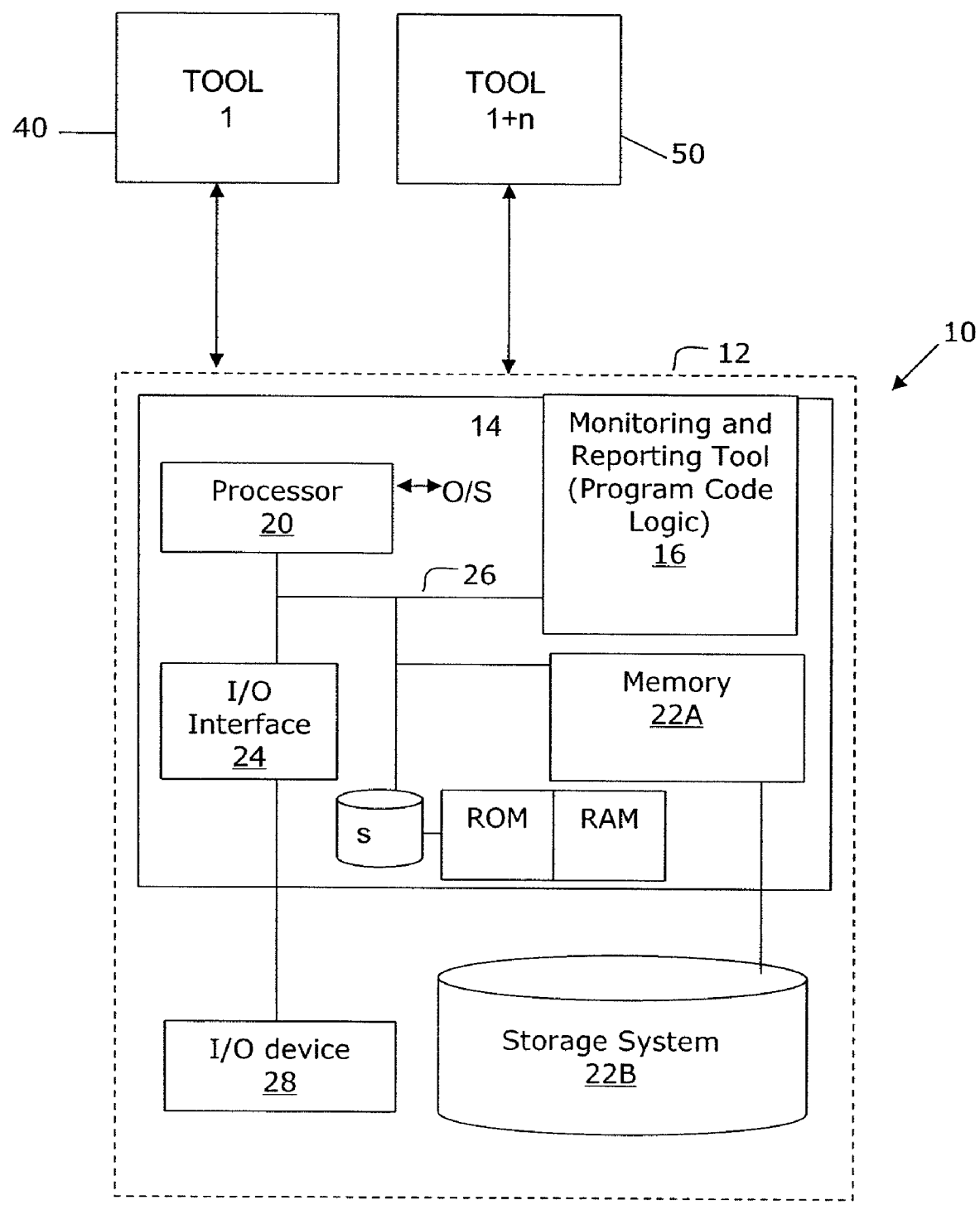
FIG. 1 shows an illustrative environment for implementing the invention.

FIG. 1 shows an illustrative system 10 for managing the processes in accordance with the invention. To this extent, the system 10 includes a computer infrastructure 12 that can perform the processes described herein. In particular, the computer infrastructure 12 includes a computing device 14 that comprises a monitoring and/or reporting tool 16. The monitoring and/or reporting tool 16 includes Program Code Logic which is capable of obtaining and reporting tool performance from tools 40, 50, which would not otherwise be obtainable during normal operating conditions. By implementing the processes, it is possible to indirectly obtain new information about the tool and process or conditioning properties such as gas temperature, gas dissociation level, chamber wall condition and outgassing, chamber conductance and/or pressure or mass flow control calibration.

For example, the monitoring and/or reporting tool 16 can monitor a semiconductor plasma processing chamber when it is operating outside its normal range. In this example, the pressure in the chamber is controlled in such a manner that the pressure control valve (also known as a throttle valve) is open wider than it is in normal operation. By observing the pressure control valve position during such a high flow and/or low pressure condition, changes to the gas temperature and/or dissociation levels are revealed as well as changes to the condition of the chamber. Without this mode of operation, sensitivities to these properties are lost.

Still referring to FIG. 1, the computing device 14 includes an external I/O device 28. The I/O device 28 can comprise any device that enables an individual to interact with the computing device 14 and specifically with the tools 40, 50 or any device that enables the computing device 14 to communicate with one or more other computing devices using any type of communications link. In this implementation, the I/O external device 28 is representative of a display; although, the external I/O device/resource 28 may be keyboards, pointing devices, etc. The display 28 can be used to view reports (e.g., data) obtained from the monitoring and/or reporting tool 16.

The computing device 14 includes a processor 20, a memory 22A, an input/output (I/O) interface 24, and a bus 26. The memory 22A can include local memory employed during actual execution of program code (including the Program Logic Code), bulk storage, and cache memories which provide temporary storage of at least some program code in order to reduce the number of times code must be retrieved from bulk storage during execution. Further, the computing device 14 is in communication with the external I/O device/resource 28 and a storage system 22B.

In general, the processor 20 executes computer program code (including the Program Logic Code), which is stored in the memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Modes of Operation

In embodiments, the operation of the tool outside normal operating conditions may be provided between processing steps of the wafer process or may be embedded into the normal and routine operation of the tool. Alternatively or additionally, the operation of the tool outside its normal operating conditions may be provided while the tool is in a manufacturing idle state in order to obtain baseline information for comparison to the information obtained during the normal and routine operation.

Figure 2:
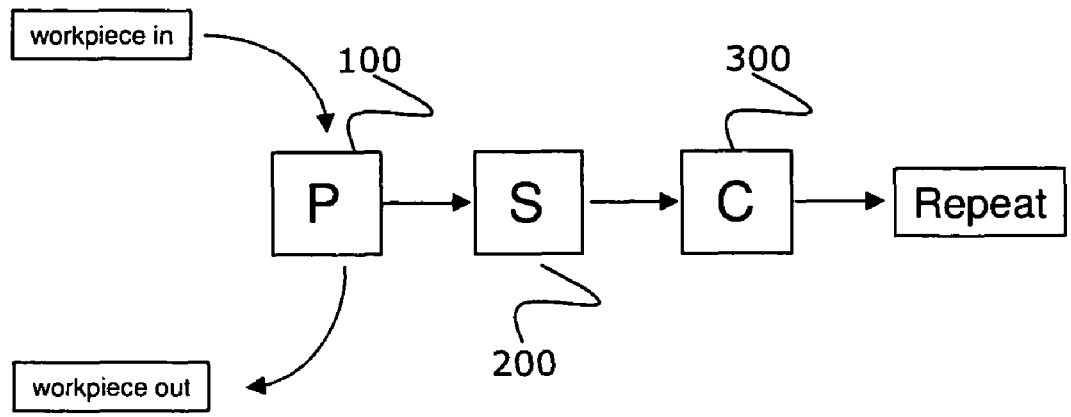
FIG. 2 representatively shows the invention implemented as a dedicated step between a process and conditioning step.

As shown representatively in FIG. 2, the conditions of the chamber can be monitored in a dedicated step between process and conditioning steps (or between process steps where there is no conditioning step) in accordance with the invention. (It should be recognized by those of skill in the art that "monitor", "measure" and "sense" can be used interchangeable herein.) That is, monitoring and data collection while in the Sensor mode ("S") 200 occurs between processing of wafers ("P") 100 and/or conditioning of the chamber ("C") 300. It should be understood by those of skill in the art that the application of the sensor mode of the present invention may occur prior to or after the processing of wafers ("P") and/or conditioning of the tool ("C"). The arrows in FIG. 2 represent the placement of the work pieces (or wafer) into and out of the chambers for processing.

Figure 3:
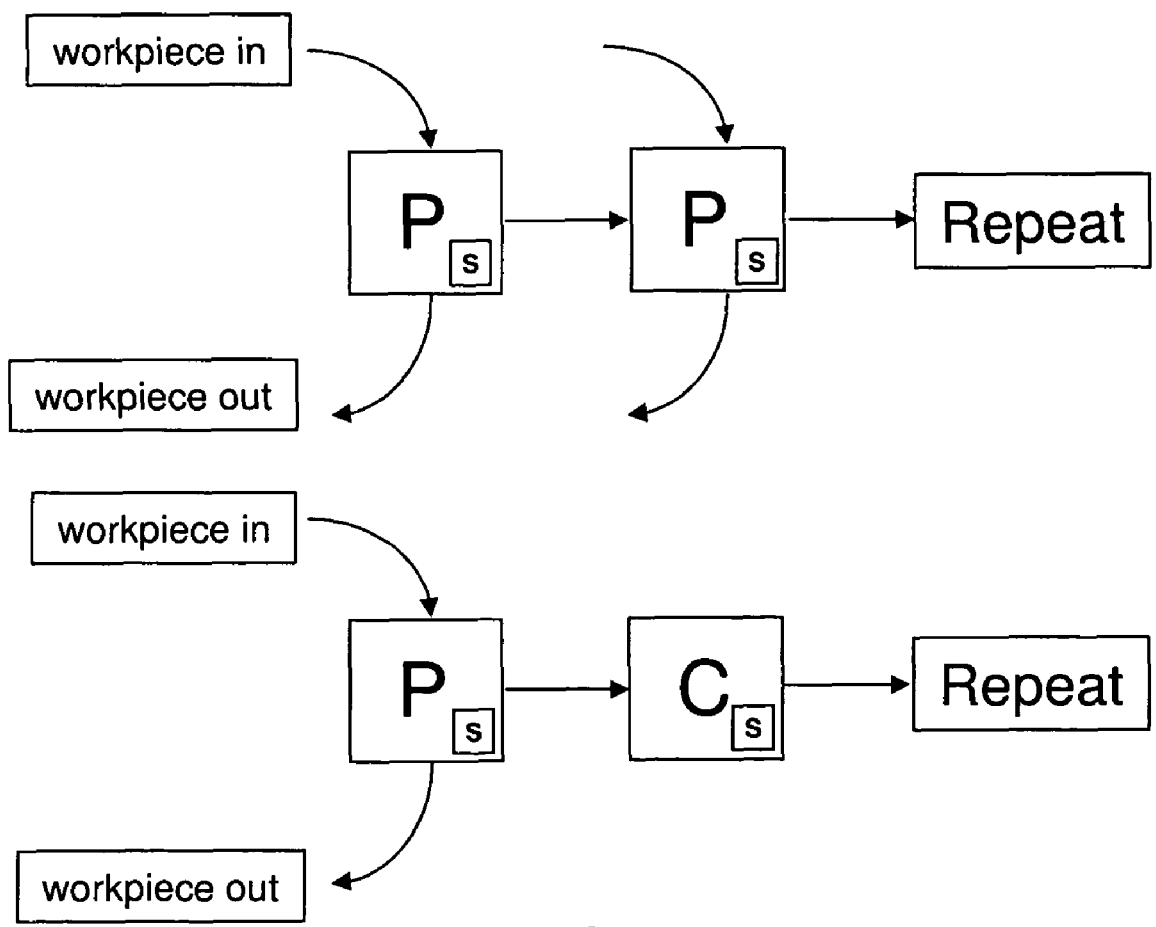
FIG. 3 representatively shows the invention implemented as an embedded component of either the process or conditioning step.

FIG. 3 representatively shows the sensor mode ("S") as an embedded step in either the processing of the wafer (P) or the conditioning of the chamber "C" in accordance with the invention. In this implementation, the operating conditions of the tools are outside their normal operating conditions at times when such conditions will not negatively affect the processing of the wafer or the conditioning of the chamber, for example. As an example, the tool can operate outside its normal operating conditions as part of the dechuck step for process recipes as this process often runs with the pressure control valve fully open. As such, a pressure slightly higher than the pressure during dechuck could work for these purposes, even during implementation of the present invention. The arrows in FIG. 3 represent the placement of the work pieces into an out of the chambers for processing.

Figure 4:
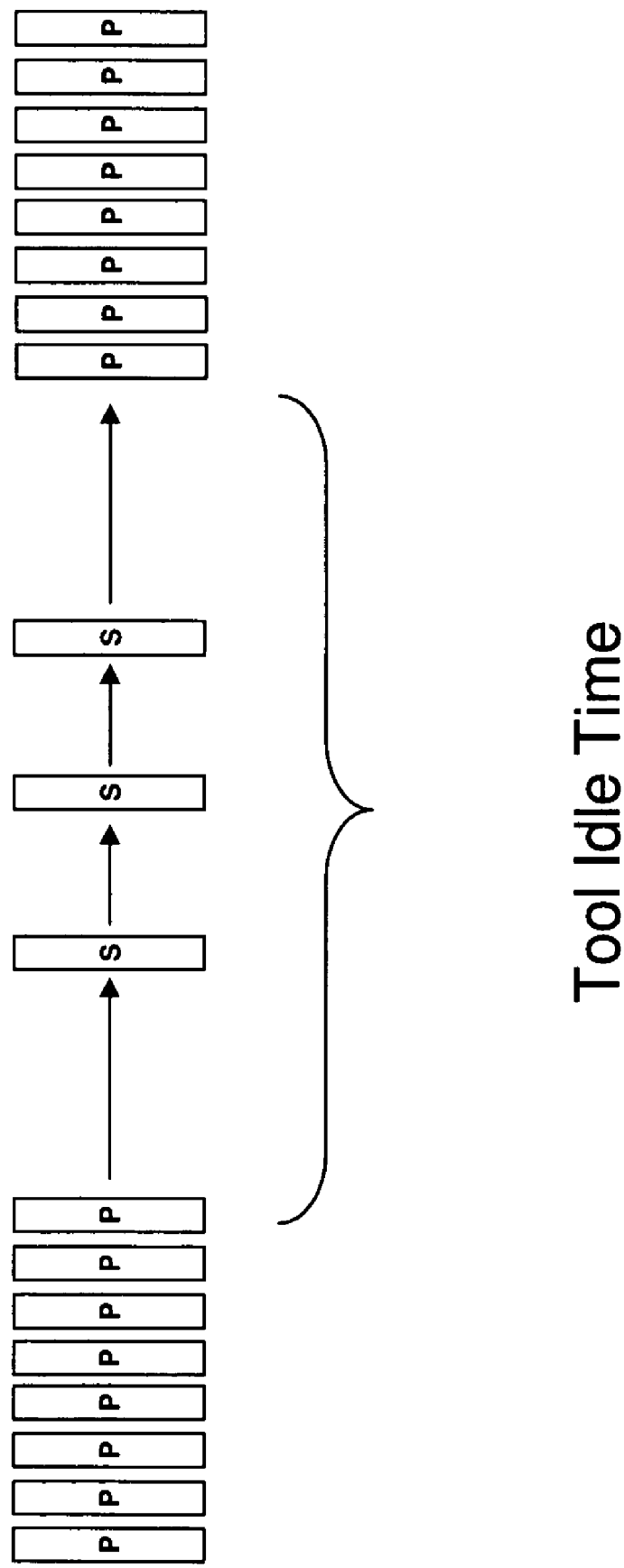
FIG. 4 representatively shows the invention implemented during manufacturing idle tool time.

FIG. 4 representatively shows monitoring and data collection of the conditions of the chamber ("S") during idle tool time in accordance with the invention. In this implementation, during the idle time, the tool or tools are operated outside normal operating conditions. When the tool(s) is outside of the normal operating conditions, measurements can be taken in order to indirectly determine conditions of the tool as discussed herein. For example, if a chamber purge is initiated after a predetermined amount of idle time, e.g., a few minutes, a cold-chamber baseline could be obtained by periodically ramping the flow or pressure to move the pressure control valve from the normal pressure control region to fully open. This information can be used to plot the position of the pressure control valve (near or fully open—most sensitive) needed for a given pressure (or flow). In this method, it is also possible to ramp back and forth continuously to obtain a stability measurement, as well as capture chamber condition variations (wall outgassing, conductance change, etc.). Implemented in this manner, a cold, non-plasma baseline can be obtained to compare to the conditions when the tool is running plasma. This ramping process is also applicable with the embodiments shown in FIGS. 2 and 3.

In alternative embodiments according to aspects of the invention, the monitoring and data collection of the conditions of the chamber can be made part of a pressure insensitive process step that perhaps runs with the pressure control valve in the fully open position (i.e. not pressure controlled). The monitoring and data collection of the conditions of the chamber can run with or without plasma or can be a process step where the gas flow or pressure control is ramped from a starting point to an ending point such that the pressure control valve makes a gradual transition from the pressure control region, through the region where new sensitivity is gained, all the way to fully open. In this way, a trace could be analyzed for a sensitive monitor quantity (e.g., a gas flow level needed to reach 95% open). This type of ramp operation would ensure that the sensitive quantity is always accessible. The data collection of the conditions of the chamber could be frequent enough to observe within lot behavior (i.e., process recipe or waterless cleans) or infrequent to monitor long term behavior (pre-lot waterless condition or monitor recipes).

Exemplary Implementation of the System of the Invention

In embodiments of the invention, small changes to gas properties and/or chamber conductance (or other parameters) can be monitored by inserting a sensitive mode of operation into either the process or conditioning steps (or both) or between the process and conditioning steps or in the idle period where no processing is being done. The sensitivity comes from operating the chamber (of the tool) with pressure and gas flow that puts the pressure control valve in an operational region that is outside of the region prescribed for processing or conditioning. In this region (e.g., between the physical limit and the limits prescribed for pressure control), the pressure control valve position is very sensitive to gas temperature, dissociation level and any other source of extra gas or conductance or pressure calibration changes in the chamber of the tool.

Normal operation conditions are defined as those conditions (pressure, gas flow, power, etc.) that put the throttle valve in a range where it is capable of pressure control to a specified level of control. They are specifically defined to avoid the region where control becomes sensitive to small changes in the gas flow and temperature and chamber conductance and wall condition and therefore less able to control pressure. But, it has been found that it is possible to monitor attributes of the manufacturing process that are normally inaccessible to observation by operating outside the normal operating conditions. The observations made when the tool is performing outside of the normal limits are then used as a way to monitor the health and evolution of the chamber (just as conventional measurements of chamber variables are used (pressure, temperatures, powers, etc).)

Figure 5:
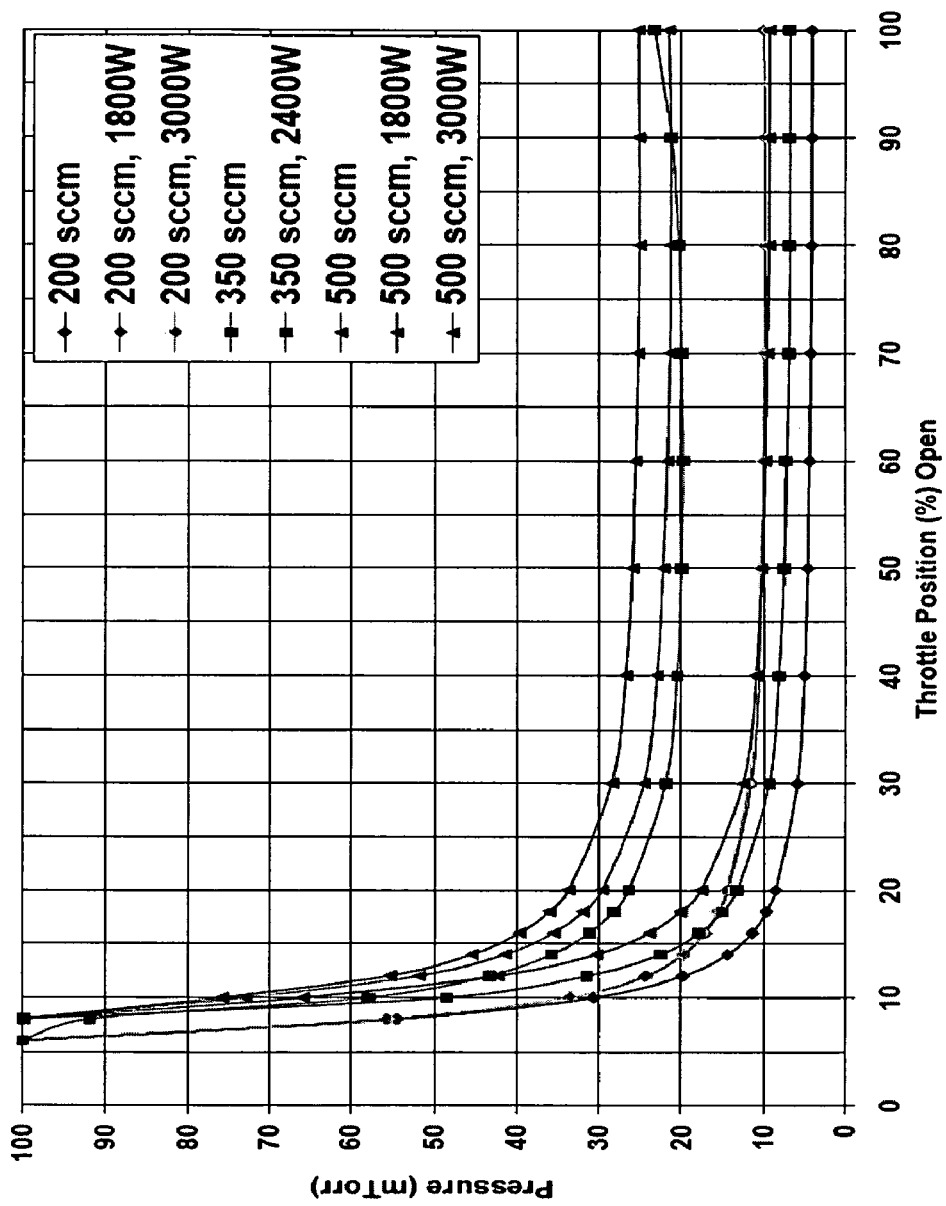
FIG. 5 shows a plot of pressure vs. pressure control valve position for pressure control in a tool.

FIG. 5 shows a plot of pressure vs. pressure control valve position for pressure control in a tool. In this plot, it is seen that the normal operating range for the throttle valve position is between about 5% to 35%. In this range of the throttle valve position, i.e., sensitive for pressure control, the pressure (in mTorr) will significantly increase or decrease with a small change in the throttle valve position. For example, the pressure with 350 sccm and at a pressure control valve position of 10% is about 58 mTorr. Comparatively, within the sensitive operation region, the pressure with 350 sccm and at a pressure control valve position of about 15% is about 33 mTorr. Accordingly, there is about a 55% change in pressure for about a 5% change in the pressure control valve position.

However, this plot also shows that from about 35% to 100% of open pressure control valve position, the pressure curve begins to flatten. This translates into an insensitive region for pressure control. In this range of the pressure control valve position, i.e., insensitive pressure control region, the pressure (in mTorr) will not significantly increase or decrease with a change in the pressure control valve position. For example, the pressure with 350 sccm and at a pressure control valve position of 40% is about 9 mTorr. Comparatively, within the insensitive pressure control region, it has been found that the pressure with 350 sccm and at a pressure control valve position of about 100% is about 8 mTorr. Accordingly, there is practically no change in pressure for about a 60% change in pressure control valve position.

But, it has been found that the pressure control valve becomes very sensitive to subtle and often otherwise invisible changes when it is positioned within the insensitive pressure control region. For example, the changes that can influence the pressure control valve position in the insensitive pressure control region collectively includes, for example, Process gas temperature;
Process gas dissociation level;
Chamber wall condition and deposition;
Outgassing;
Pressure gage calibration;
Chamber conductance; and
MFC Calibration.

As discussed above, the chamber may be controlled so as to put the pressure control valve position into an insensitive pressure control region during the manufacturing process, which then places the chamber out of the normal operational zone. This may be performed, as discussed above, between wafer processing, during wafer processing, during chamber conditioning or during idle time. As explained with reference to FIG. 5, this would be done through a combination of low pressure and high flow. The position of the pressure control valve can then act as a sensitive sensor for changes in the above noted parameters.

Figure 6:
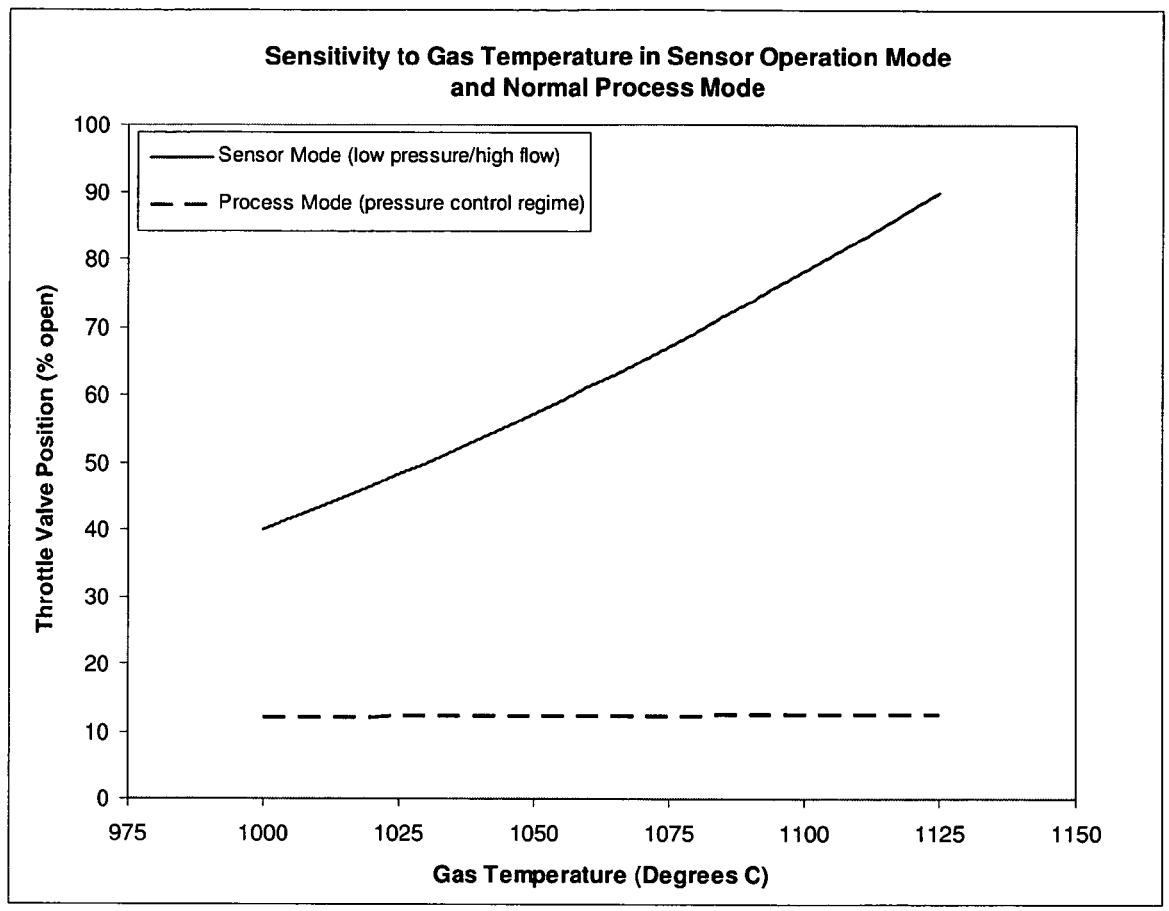
FIG. 6 shows an exemplary graph comparing expected sensitivity to gas temperature in a tool within normal operating conditions vs. outside of normal operating conditions.

FIG. 6 shows an exemplary graph comparing sensitivity to gas temperature in a tool under normal operating conditions vs. outside of normal operating conditions. More specifically, as shown in the graph of FIG. 6, if the temperature changes, the pressure control valve will move by an insignificant amount. So, for example, during normal operating conditions of the tool, if the temperature rises from about 1000° C. to about 1125° C., the pressure control valve will open from about 12.2% to about 12.7%, respectively. In other words, in this example, the pressure control valve will vary 0.5% when the temperature varies about 125° C. This is a significant change in temperature over an insignificant change in pressure control valve opening. To this extent, it would not be possible or practical to measure pressure control valve opening based on gas temperature variation during normal operating conditions.

In contrast, during the sensor mode operation (i.e., running the tool outside normal operating conditions) if the temperature changes, the pressure control valve will move in a measurable way (compared to in the normal operating mode, where the pressure control valve would move by an insignificant amount). So, for example (using the sensitivity curve in FIG. 6), if the temperature rises from 1000° C. to 1125° C. then the pressure control valve will open from 40% to 90%, respectively, in the sensor mode operating range. In other words, in this example, the pressure control valve will vary 50% (absolute) when the temperature varies about 1125° C. For this reason, there will a significant change in pressure control valve opening over a significant gas temperature change (compared to 0.5% change in the normal operating condition). To this extent, it is possible and practical to be sensitive to gas temperature changes based on the pressure control valve position when the pressure control valve position is outside a normal operating condition. Accordingly, it is now possible to be sensitive to gas temperature changes using existing tool elements. The data may be used for statistical process control (SPC), Fault Detection and Classification (FDC) or other monitoring or analyses for a single tool or comparison amongst a tool set (more than one tool).

Figure 7:
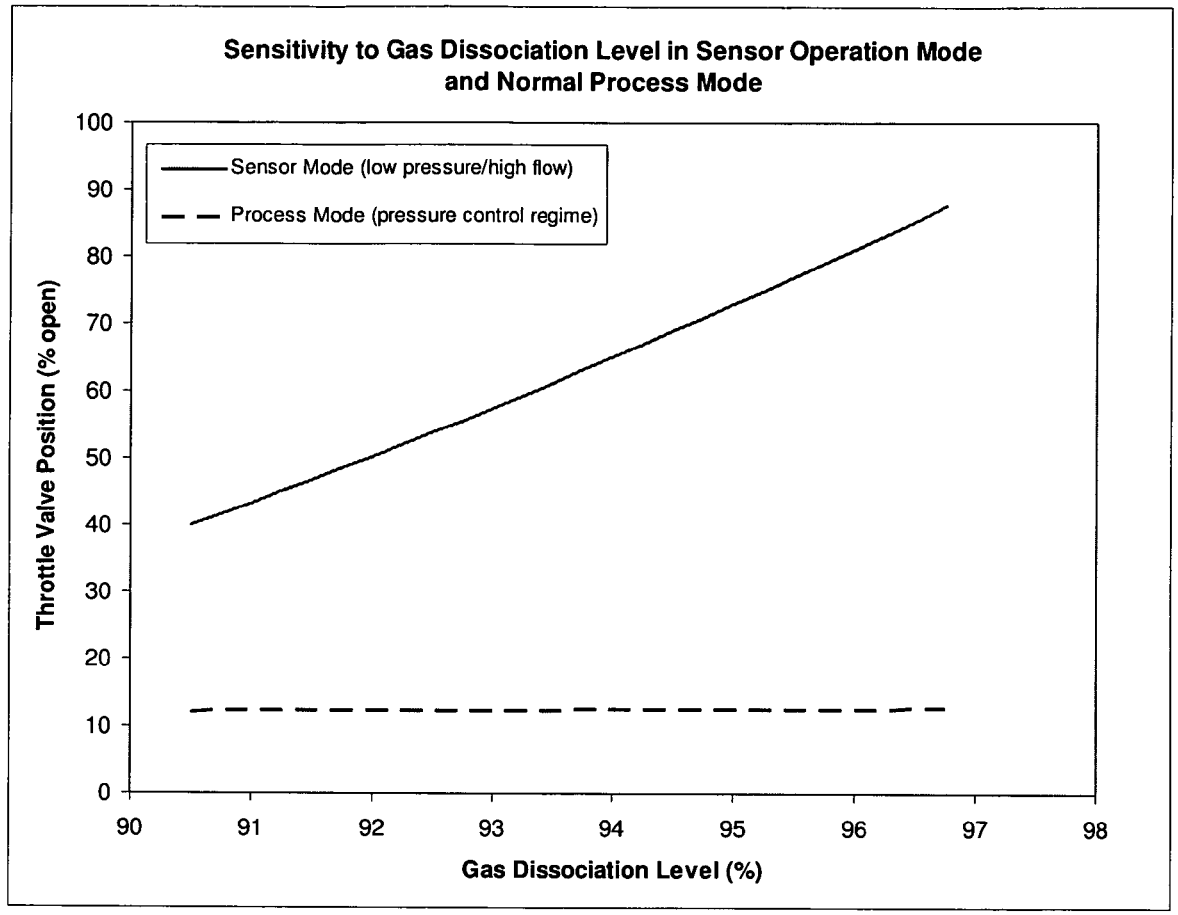
FIG. 7 shows an exemplary graph comparing expected sensitivity to gas dissociation level in a tool within normal operating conditions vs. outside of normal operating conditions.

FIG. 7 shows an exemplary graph comparing sensitivity to gas dissociation level in a tool under normal operating conditions vs. outside of normal operating conditions. More specifically, as shown in the graph of FIG. 7 during the normal operating conditions, the pressure control valve will open from 12.2% to 12.7%, respectively, when the gas dissociation level rises from 90.5% to 96.75%. In other words, the pressure control valve position will vary about 0.5% when the gas dissociation level varies about 6.25% (absolute). This is an insignificant change in pressure control valve position over a significant change in gas dissociation level. To this extent, the pressure control valve position would not be sensitive to this level of change of the gas dissociation level while it is operating in the normal operation range.

In contrast, during the sensor mode operation (i.e., running the tool outside normal operating conditions) the pressure control valve will open from about 40% to 90%, respectively, when the gas dissociation level rises from about 90.5% to 96.75%. In other words, the pressure control valve position will change about 50% (absolute) when the gas dissociation level varies about 6.25%. For this reason, it has been found that there is a significant change in pressure control valve position when there is a significant change in gas dissociation level. To this extent, it is possible and practical to be sensitive to changes to the gas dissociation level based on pressure control valve position when the pressure control valve position is outside a normal operating condition. The data may be used for statistical process control (SPC), Fault Detection and Classification (FDC) or other monitoring or analyses for a single tool or comparison amongst a tool set (more than one tool).

Also, as should be understood by those of skill in the art, the pressure control valve position will be sensitive to changes in other chamber parameters, otherwise not obtainable from existing sensors and/or measurements under normal operating conditions. For example, the pressure control valve position can be used to monitor the status of the chamber and it will be sensitive to the gas temperature and/or gas dissociation level, as well as chamber wall condition and deposition (for example, due to the influence on gas recombination), outgassing and/or chamber conductance as well as pressure gage and gas flow gage calibrations.

Exemplary Processes

Figure 8:
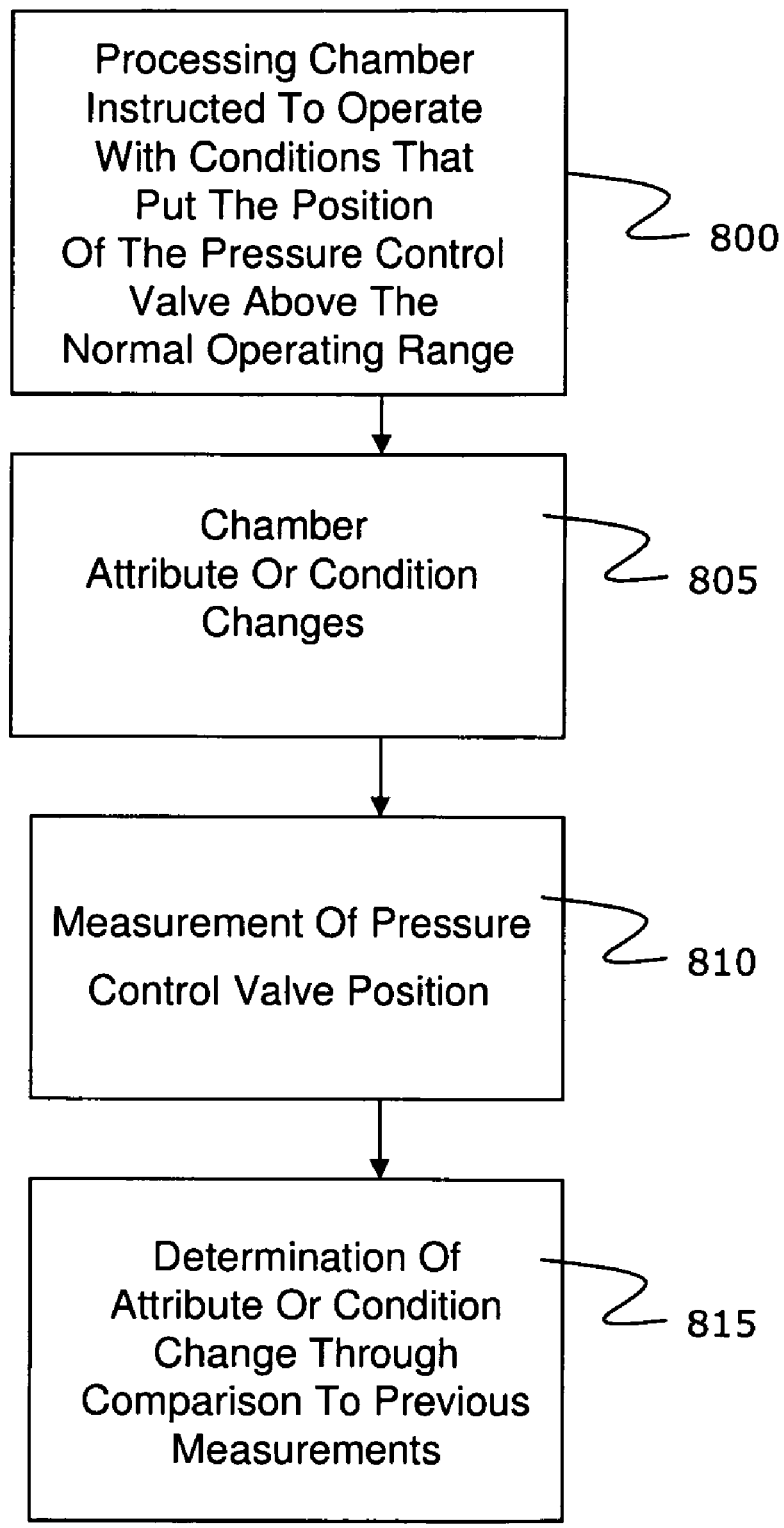
FIG. 8 shows a flow chart of an exemplary process in accordance with the invention.

FIG. 8 shows a flow chart of an exemplary process in accordance with the invention. The processes of the flow chart may occur at different times during the manufacturing process. For example, the processes can be embedded into the wafer processing during fabrication, e.g., dechucking, when pressure variations are not important to the processing cycle. Alternatively or additionally, the processes of the present invention can occur during tool idle time or between wafer processing times. Additionally, it should be understood by those of skill in the art that the measurements obtained by the present invention can be used for various purposes. For example, the measurements (data) can be used to compare tool performance over time, compare tool performance to a baseline measurement or compare tool performance amongst different tools in the tool set during a single cycle or over time. More specifically, the data may be used for statistical process control (SPC), Fault Detection and Classification (FDC) or other monitoring or analysis procedures.

FIG. 8 may equally represent a high-level block diagram of components of the invention implementing the steps thereof. The steps of FIG. 8 may be implemented on computer program code (Program Code Logic) in combination with the appropriate hardware as shown representatively in FIG. 1. The computer program code may be stored on storage media such as a diskette, hard disk, CD-ROM, DVD-ROM or tape, as well as a memory storage device or collection of memory storage devices such as read-only memory (ROM) or random access memory (RAM), generally represented as reference numerals 22A or 22B of FIG. 1. Additionally, the computer program code can be transferred to a workstation over the Internet or some other type of network.

At step 800, the processing chamber may be instructed to operate with conditions that put the position of the pressure control valve above a normal operating condition. In one example, the pressure control valve position can be above about 35% open. At step 805, an attribute of or in the chamber changes, e.g., gas dissociation level, temperature, etc. At step 810, the pressure control valve will move due to the change in the attribute of or in the chamber. In one example, the pressure control valve will open a significant amount due to a change in the dissociation level. At step 810, the position of the pressure control valve is recorded. In this example, the pressure control valve position has changed significantly. At step 815, a determination is made from the position of the pressure control valve that some attribute of the tool had changed or is different from a comparison set of tools, for example.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described in terms of exemplary embodiments, those skilled in the art will recognize that the invention can be practiced with modifications and in the spirit and scope of the appended claims.

The invention claimed is:

1. A method, comprising:
operating a tool working at an operating mode such that at least one of its control parameters is outside of a normal operating range;
measuring the at least one of the control parameters of the tool working at the operating mode outside of the normal operating range;
detecting a change to a condition of the tool based on the measuring of the at least one control parameter, wherein the condition comprises one of: process gas temperature; process gas dissociation level; chamber wall condition and deposition; outgassing; pressure gage calibration; chamber conductance; and mass flow control (MFC) calibration; and
comparing the parameter across multiple tools for determining differences between the tools,
wherein the operating the tool occurs at least one of:
between processing steps of the tool;
while the tool is in a manufacturing idle state;
between conditioning steps of the tool;
before or after processing a wafer on the tool; and
before or after conditioning of the tool.

2. The method of claim 1, wherein the operating mode puts a pressure control valve of a vacuum processing chamber above about 35% open.

3. The method of claim 2, wherein the operating mode puts the pressure control valve of a vacuum processing chamber above 40% open.

4. The method of claim 1, wherein the measuring of the parameter is used for statistical process control (SPC), Fault Detection and Classification (FDC), monitoring or analyses of the tool.

5. The method of claim 1, further comprising ramping a flow or pressure to move a pressure control valve from a normal control region to substantially open or fully open position.

6. The method of claim 1, wherein the operating mode is embedded within at least one processing step or conditioning step of a fabrication process.

7. The method of claim 1, wherein the operating mode is a dedicated step executed before or after a conditioning step or a wafer processing step.

8. The method of claim 1, wherein the operating mode is executed during an idle time of the tool.

9. The method of claim 8, further comprising ramping a flow or pressure to obtain a cold-chamber baseline measurement of at least one of wall outgassing and conductance change.

10. The method of claim 9, wherein the ramping is continuous during the idle time.

11. The method of claim 1, wherein the tool is a wafer processing tool of a semiconductor fabrication facility.

12. A method comprising operating a chamber of a tool set at a non-normal operating mode, measuring at least one control parameter of the chamber of the tool set when in an insensitive operating region and comparing the at least one control parameter to determine a condition of the chamber,
wherein the condition comprises one of: process gas temperature; process gas dissociation level; chamber wall condition and deposition; outgassing; pressure gage calibration; chamber conductance; and mass flow control (MFC) calibration,
wherein the tool set is at least two tools and the measuring of the parameters is in two chambers in an insensitive operating region, and the comparing is comparing the parameters of the at least two tools to determine chamber conditions, and
wherein the operating occurs at least one of:
between processing steps of the chamber;
while the chamber is in a manufacturing idle state;
between conditioning steps of the chamber;
before or after processing a wafer in the chamber; and
before or after conditioning of the chamber.

13. The method of claim 12, wherein the insensitive operating region is above about 35% of a pressure control valve opening.

14. The method of claim 12, wherein the insensitive operating region is a sensitive region for determining at least gas temperature and gas dissociation level.

15. The method of claim 12, wherein the parameters are measurements:
taken during an idle time of the tool set;
embedded during at least one processing step of a fabrication process; or
taken before or after a conditioning step or a wafer processing step.

16. A system monitoring conditions in chambers of tools implemented on a computer program product comprising a computer readable media, the computer program product being operable to:
operate a tool outside its normal operating mode at least one of: between processing steps of the tool; while the tool is in a manufacturing idle state; between conditioning steps of the tool; before or after processing a wafer on the tool; and before or after conditioning of the tool;
measure at least one control parameter of the tool working at the operating mode outside of its normal operating mode; and
detect a change to a condition of the tool based on the measuring of the at least one control parameter, wherein the condition comprises one of: process gas temperature; process gas dissociation level; chamber wall condition and deposition; outgassing; pressure gage calibration; chamber conductance; and mass flow control (MFC) calibration;
wherein the at least one control parameters comprises a position of a pressure control valve, and the operating comprises instructing a wafer processing chamber to operate at conditions that move the pressure control valve to a position outside of the normal operating range of the pressure control valve.

17. The system of claim 16, wherein the computer program product being operable to provide, based on the detecting a change, statistical process control (SPC), Fault Detection and Classification (FDC), monitoring or analyses of the tool.

18. The system of claim 17, wherein the computer program product is operable to detect changes to at least one of: gas temperature, gas dissociation level, chamber wall condition and deposition; outgassing; pressure gage calibration; chamber conductance; and mass flow control (MFC) calibration.

19. The system of claim 16, wherein the tool is a wafer processing tool of a semiconductor fabrication facility.

20. A method of monitoring manufacturing equipment in a semiconductor fabrication facility, the method comprising:
operating a wafer processing tool at a non-normal operating mode by instructing a wafer processing chamber to operate at conditions that move a pressure control valve to a position outside of a normal operating range of the pressure control valve, wherein the position is in an insensitive pressure control region;

after the operating at the non-normal operating mode, operating the wafer processing tool at a normal operating mode;

measuring at least one control parameter of the wafer processing tool during the non-normal operating mode by measuring a changed position of the pressure control valve in the insensitive pressure control region; and detecting a change to a condition of the wafer processing tool based on the measured changed position of the pressure control valve, wherein the condition comprises one of: process gas temperature; process gas dissociation level; chamber wall condition and deposition; outgassing; pressure gage calibration; chamber conductance; and mass flow control (MFC) calibration, wherein the operating a wafer processing tool occurs at least one of:

between processing steps of the wafer processing tool; and while the wafer processing tool is in a manufacturing idle state.

* * * * *